(12) United States Patent
Foster et al.

(10) Patent No.: US 6,938,114 B2
(45) Date of Patent: Aug. 30, 2005

(54) METHOD AND APPARATUS FOR MANAGING ACCESS TO A SERVICE PROCESSOR

(75) Inventors: Robert Kimberlin Foster, Austin, TX (US); Casey Lee McCreary, Liberty Hill, TX (US); Charles Andrew McLaughlin, Round Rock, TX (US); David R. Willoughby, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 456 days.

(21) Appl. No.: 09/798,165

(22) Filed: Mar. 1, 2001

(65) Prior Publication Data

US 2002/0124126 A1 Sep. 5, 2002

(51) Int. Cl.[7] .............................................. G06F 12/00
(52) U.S. Cl. ....................................... 710/200; 711/13
(58) Field of Search ................................. 710/260–266, 710/200; 711/153, 173; 712/13

(56) References Cited

U.S. PATENT DOCUMENTS 6,477,597 B1 * 11/2002 Sorace et al. ............... 710/200
6,529,983 B1 * 3/2003 Marshall et al. ............ 710/200
2003/0159086 A1 * 8/2003 Arndt ........................... 714/25

* cited by examiner

Primary Examiner—Tim Vo
Assistant Examiner—Kim T. Huynh
(74) Attorney, Agent, or Firm—Duke W. Yee; Mark E. McBurney; Lisa L. B. Yociss

(57) ABSTRACT

A method, apparatus, and computer implemented instructions for providing a plurality of terminals access to a service processor located within the data processing system. A first indication is returned if the service processor is unlocked in response to receiving a request from a terminal to provide a terminal within the plurality of terminals sole access to access the service processor. The service processor is locked to provide the terminal sole access to service processor in response to receiving a request to provide a terminal sole access to access the service processor. In response to receiving a request to provide a terminal sole access to access the service processor, a second indication is returned if the service processor is locked.

18 Claims, 4 Drawing Sheets

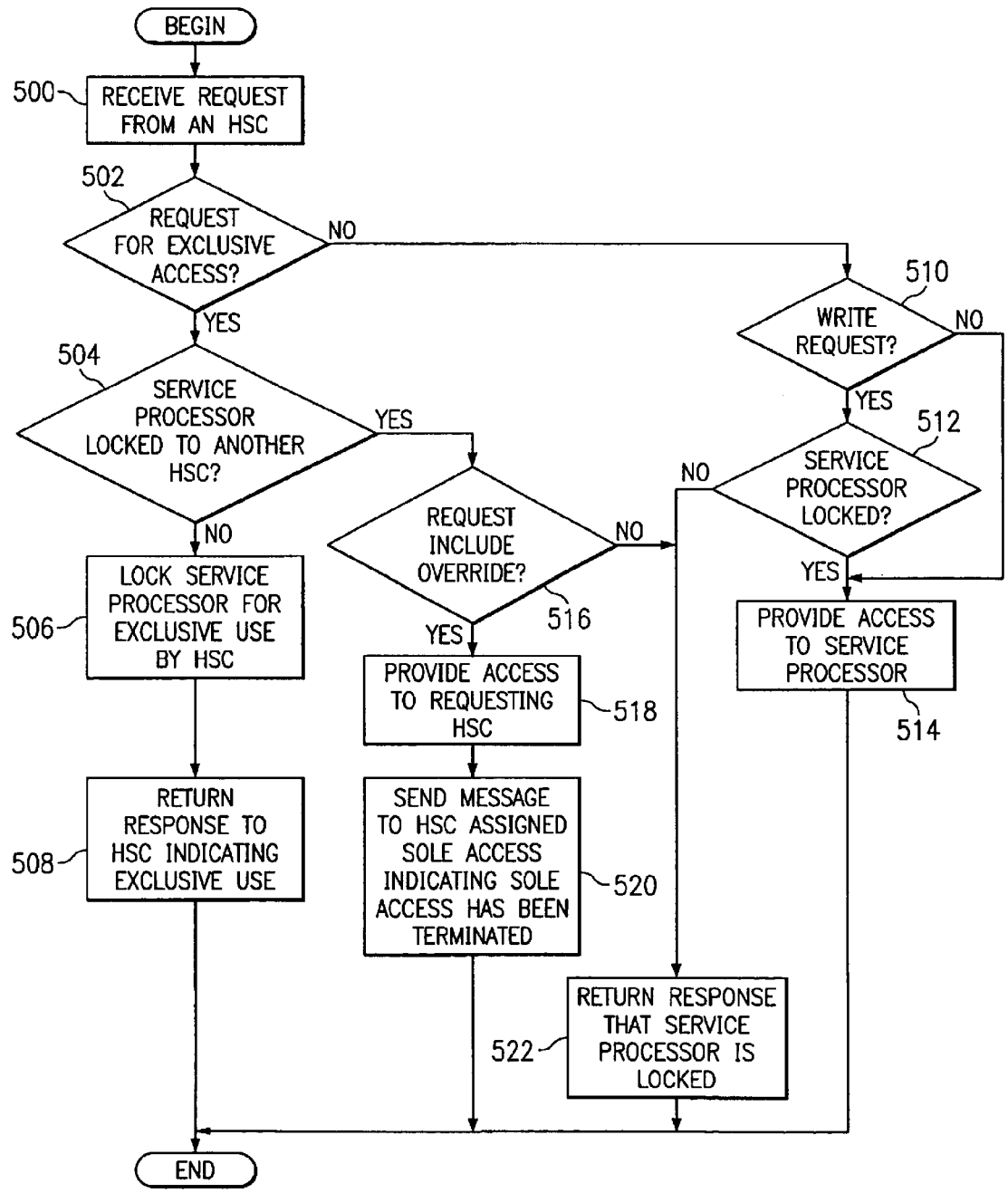

METHOD AND APPARATUS FOR MANAGING ACCESS TO A SERVICE PROCESSOR

BACKGROUND OF THE INVENTION

1. Technical Field

The present invention relates generally to an improved data processing system and in particular to a method and apparatus for managing configuration data in a configurable data processing system. Still more particularly, the present invention provides a method and apparatus for maintaining profiles used to configure a configurable data processing system.

2. Description of Related Art

A logical partitioning option (LPAR) within a data processing system (platform) allows multiple copies of a single operating system (OS) or multiple heterogeneous operating systems to be simultaneously run on a single data processing system platform. A partition, within which an operating system image runs, is assigned a non-overlapping sub-set of the platform's resources. These platform allocable resources include one or more architecturally distinct processors with their interrupt management area, regions of system memory, and I/O adapter bus slots. The partition's resources are represented by its own open firmware device tree to the OS image.

Each distinct OS or image of an OS running within the platform are protected from each other such that software errors on one logical partition cannot affect the correct operation of any of the other partitions. This is provided by allocating a disjoint set of platform resources to be directly managed by each OS image and by providing mechanisms for ensuring that the various images cannot control any resources that have not been allocated to it. Furthermore, software errors in the control of an OS's allocated resources are prevented from affecting the resources of any other image. Thus, each image of the OS (or each different OS) directly controls a distinct set of allocable resources within the platform.

The configuration of these different partitions are typically managed through a terminal, such as a hardware system console (HSC). These terminals use objects, also referred to as profiles that are defined and modified in HSC. The profiles are used to configure LPARs within the data processing system. Multiple HSCs may be present and used for maintaining and configuring LPARs in the data processing system. These profiles used to configure the data processing system in LPARs are often required to be accessible to any HSC that is in communication with the data processing system. Maintaining profiles between these HSCs are often difficult and require processes for maintaining synchronization of the profiles at each HSC.

Therefore, it would be advantageous to have improved method, apparatus, and computer implemented instructions for maintaining profiles for different HSCs.

SUMMARY OF THE INVENTION

The present invention provides a method, apparatus, and computer implemented instructions for providing a plurality of terminals access to a service processor located within the data processing system. A first indication is returned if the service processor is unlocked in response to receiving a request from a terminal to provide a terminal within the plurality of terminals sole access to access the service processor. The service processor is locked to provide the terminal sole access to service processor in response to receiving a request to provide a terminal sole access to access the service processor. In response to receiving a request to provide a terminal sole access to access the service processor, a second indication is returned if the service processor is locked.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 5 is a flowchart of a process used for managing access to a service processor in accordance with a preferred embodiment of the present invention.

DETAILED DESCRIPTION OF THE PREFERRED EMBODIMENT

Figure 1:
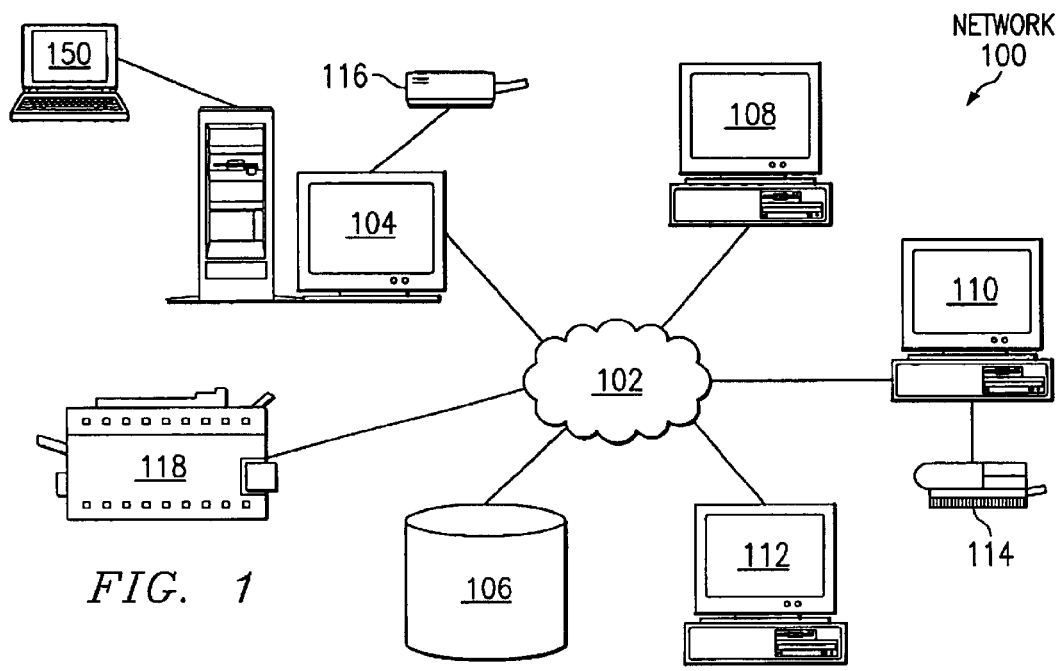
FIG. 1 is a pictorial representation of a distributed data processing system in which the present invention may be implemented.

With reference now to the figures, and in particular with reference to FIG. 1, a pictorial representation of a distributed data processing system is depicted in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, server 104 is connected to hardware system console 150. Server 104 is also connected to network 102, along with storage unit 106. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network 102. In the depicted example, server 104 is a logically partitioned platform and provides data, such as boot files, operating system images and applications, to clients 108–112. Hardware system console 150 may be a laptop computer and is used to display messages to an operator from each operating system image running on server 104, as well as to send input information, received from the operator, to server 104. Clients 108, 110 and 112 are clients to server 104. Distributed data processing system 100 may include additional servers, clients, and other devices not shown. Distributed data processing system 100 also includes printers 114, 116 and 118. A client, such as client 110, may print directly to printer 114. Clients, such as client 108 and client 112, do not have directly attached printers. These clients may print to printer 116, which is attached to server 104, or to printer 118, which is a network printer that does not require connection to a computer for printing documents. Client 110, alternatively, may print to printer 116 or printer 118, depending on the printer type and the document requirements.

In the depicted example, distributed data processing system 100 is the Internet, with network 102 representing a worldwide collection of networks and gateways that use the TCP/IP suite of protocols to communicate with one another. At the heart of the Internet is a backbone of high-speed data communication lines between major nodes or host computers consisting of thousands of commercial, government, education, and other computer systems that route data and messages. Of course, distributed data processing system 100 also may be implemented as a number of different types of networks, such as, for example, an intranet or a local area network.

FIG. 1 is intended as an example and not as an architectural limitation for the processes of the present invention.

Figure 2:
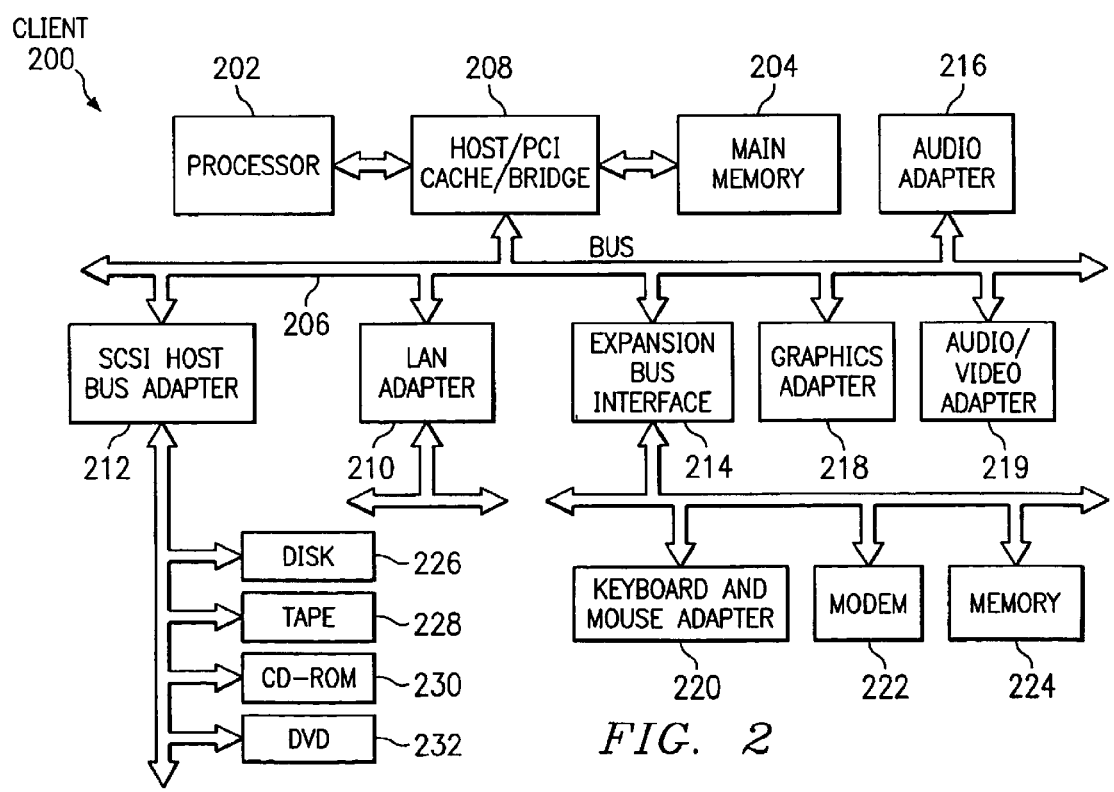
FIG. 2 is a block diagram of a data processing system in accordance with the present invention.

With reference now to FIG. 2, a block diagram of a data processing system in accordance with the present invention is illustrated. Data processing system 200 is an example of a hardware system console, such as hardware system console 150 depicted in FIG. 1. Data processing system 200 employs a peripheral component interconnect (PCI) local bus architecture. Although the depicted example employs a PCI bus, other bus architectures, such as Micro Channel and ISA, may be used. Processor 202 and main memory 204 are connected to PCI local bus 206 through PCI bridge 208. PCI bridge 208 may also include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. In the depicted example, SCSI host bus adapter 212 provides a connection for hard disk drive 226, tape drive 228, CD-ROM drive 230, and digital video disc read only memory drive (DVD-ROM) 232. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system, such as AIX, which is available from International Business Machines Corporation. "AIX is a trademark of International Business Machines Corporation. An object-oriented programming system, such as Java, may run in conjunction with the operating system, providing calls to the operating system from Java programs or applications executing on data processing system 200. Instructions for the operating system, the object-oriented operating system, and applications or programs are located on a storage device, such as hard disk drive 226, and may be loaded into main memory 204 for execution by processor 202.

Those of ordinary skill in the art will appreciate that the hardware in FIG. 2 may vary depending on the implementation. For example, other peripheral devices, such as optical disk drives and the like, may be used in addition to or in place of the hardware depicted in FIG. 2. The depicted example is not meant to imply architectural limitations with respect to the present invention. For example, the processes of the present invention may be applied to multiprocessor data processing systems.

Figure 3:
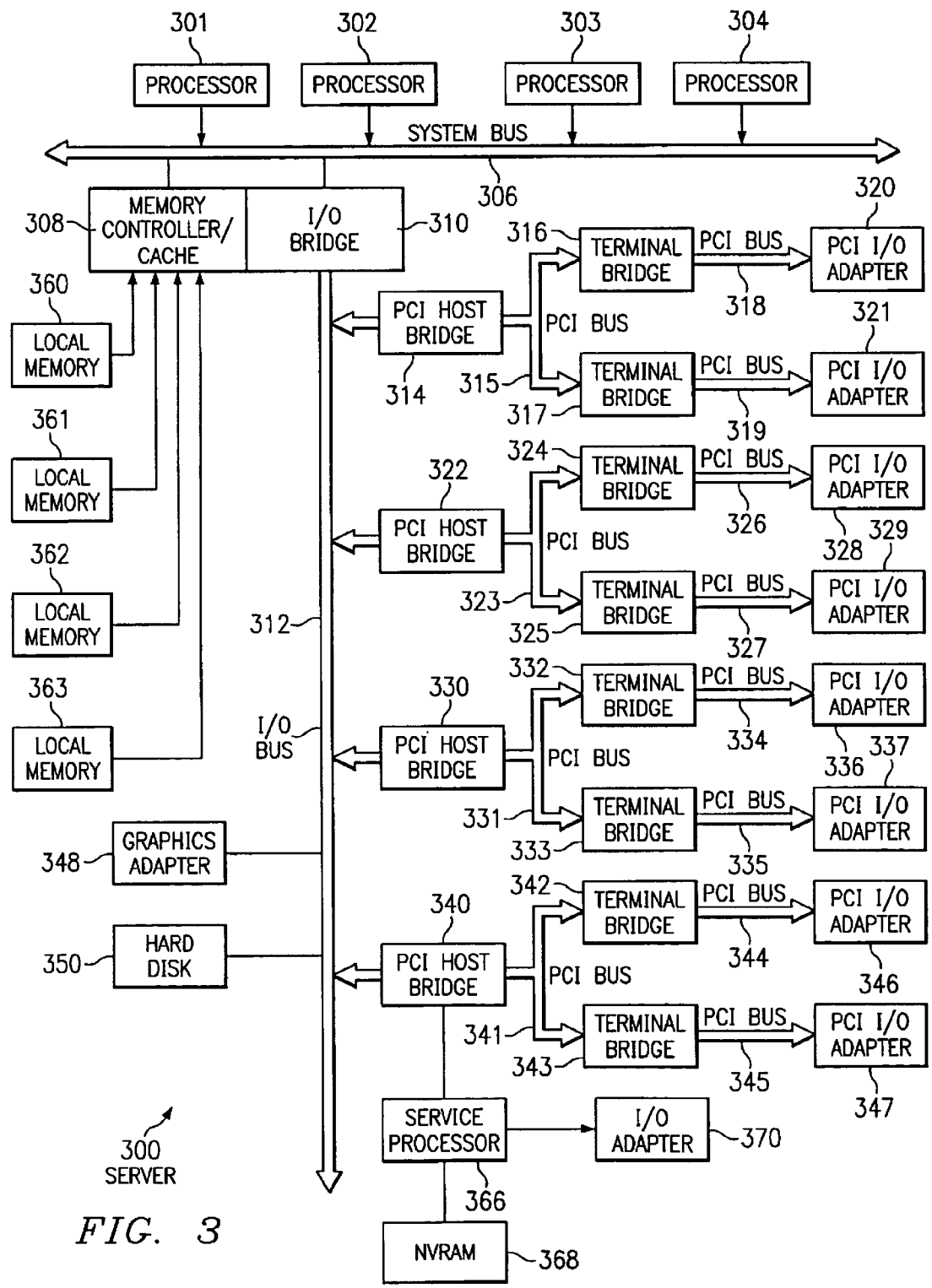
FIG. 3 is a block diagram of a data processing system, which may be implemented as a logically partitioned server.

With reference now to FIG. 3, a block diagram of a data processing system, which may be implemented as a logically partitioned server, such as server 104 in FIG. 1, is depicted in accordance with the present invention. Data processing system 300 may be a symmetric multiprocessor (SMP) system including a plurality of processors 301, 302, 303, and 304 connected to system bus 306. For example, data processing system 300 may be an IBM pSeries eServer, a product of International Business Machines Corporation in Armonk, N.Y. Alternatively, a single processor system may be employed. Also connected to system bus 306 is memory controller/cache 308, which provides an interface to a plurality of local memories 360–363. I/O bus bridge 310 is connected to system bus 306 and provides an interface to I/O bus 312. Memory controller/cache 308 and I/O bus bridge 310 may be integrated as depicted.

Data processing system 300 is a logically partitioned data processing system. Thus, data processing system 300 may have multiple heterogeneous operating systems (or multiple instances of a single operating system) running simultaneously. Each of these multiple operating systems may have any number of software programs executing within in it. Data processing system 300 is logically partitioned such that different I/O adapters 320–321, 328–329, 336–337, and 346–347 may be assigned to different logical partitions.

Thus, for example, suppose data processing system 300 is divided into three logical partitions, P1, P2, and P3. Each of I/O adapters 320–321, 328–329, and 336–337, each of processors 301–304, and each of local memories 360–364 is assigned to one of the three partitions. For example, processor 301, memory 360, and I/O adapters 320, 328, and 329 may be assigned to logical partition P1; processors 302–303, memory 361, and I/O adapters 321 and 337 may be assigned to partition P2; and processor 304, memories 362–363, and I/O adapters 336 and 346–347 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX) operating system may be executing within partition P1, a second instance (image) of the AIX operating system may be executing within partition P2, and a LINUX operating system may be operating within logical partition P3. LINUX is a version of UNIX and is an open source software operating system.

Peripheral component interconnect (PCI) Host bridge 314 connected to I/O bus 312 provides an interface to PCI local bus 315. A number of terminal bridges 316–317 may be connected to PCI bus 315. Typical PCI bus implementations will support four terminal bridges for providing expansion slots or add-in connectors. Each of terminal bridges 316–317 is connected to a PCI I/O Adapter 320–321 through a PCI Bus 318–319. Each I/O Adapter 320–321 provides an interface between data processing system 300 and input/output devices such as, for example, other network computers, which are clients to server 300. Only a single I/O adapter 320–321 may be connected to each terminal bridge 316–317. Each of terminal bridges 316–317 is configured to prevent the propagation of errors up into the PCI Host Bridge 314 and into higher levels of data processing system 300. By doing so, an error received by any of terminal bridges 316–317 is isolated from the shared buses 315 and 312 of the other I/O adapters 321, 328–329, and 336–337 that may be in different partitions. Therefore, an error occurring within an I/O device in one partition is not "seen" by the operating system of another partition. Thus, the integrity of the operating system in one partition is not effected by an error occurring in another logical partition. Without such isolation of errors, an error occurring within an I/O device of one partition may cause the operating systems or application programs of another partition to cease to operate or to cease to operate correctly.

Additional PCI host bridges 322, 330, and 340 provide interfaces for additional PCI buses 323, 331, and 341. Each of additional PCI buses 323, 331, and 341 are connected to a plurality of terminal bridges 324–325, 332–333, and 342–343, which are each connected to a PCI I/O adapter 328–329, 336–337, and 346–347 by a PCI bus 326–327, 334–335, and 344–345. Thus, additional I/O devices, such as, for example, modems or network adapters may be supported through each of PCI I/O adapters 328–329, 336–337, and 346–347. In this manner, server 300 allows connections to multiple network computers. A memory mapped graphics adapter 348 and hard disk 350 may also be connected to I/O bus 312 as depicted, either directly or indirectly. Hard disk 350 may be logically partitioned between various partitions without the need for additional hard disks. However, additional hard disks may be utilized if desired.

Management of logical partitions is achieved through terminals, such as hardware system consoles (HSC). This access is provided in these examples through service processor 366, nonvolatile random access memory (NVRAM) 368, and input/output (I/O) adapter 370, which may be implemented as a Universal Asynchronous Receiver Transmitter (UART). HSCs connect to service processor 366 through I/O adapter 370. NVRAM 368 contains objects, such as profiles used to configure and manage logical partitions within data processing system 300. In these examples, the profiles stored in NVRAM 368 are sent to HSCs as they come online or connect to data processing system 300 through I/O adapter 370. This architecture provides a mechanism to avoid having to store profiles for logical partitions at the HSCs. Further, synchronization mechanisms to maintain profiles duplicated at different HSCs also are not required with this architecture.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

Figure 4:
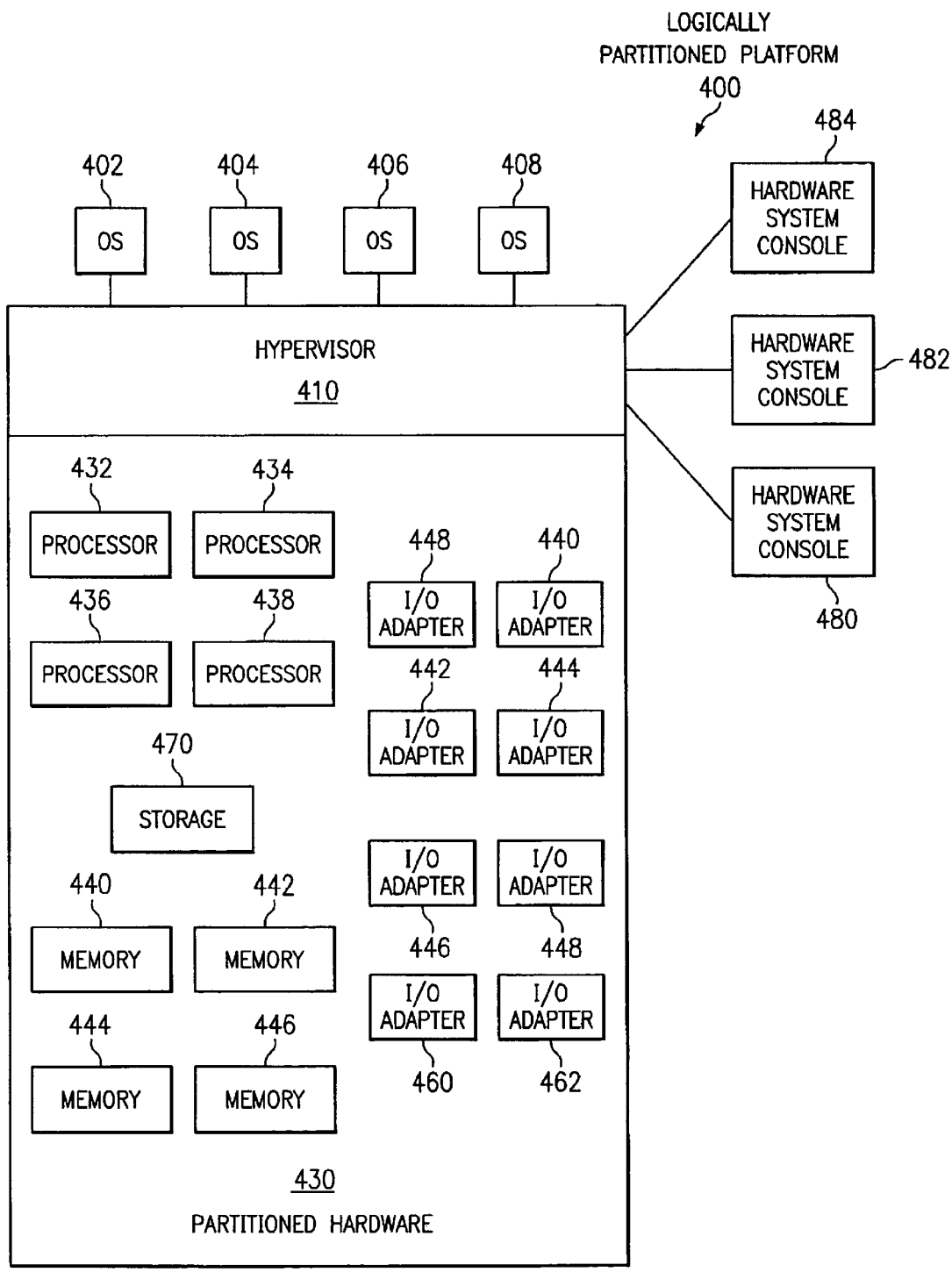
FIG. 4 is a block diagram of an exemplary logically partitioned platform in which the present invention may be implemented.

With reference now to FIG. 4, a block diagram of an exemplary logically partitioned platform is depicted in which the present invention may be implemented. The hardware in logically partitioned platform 400 may be implemented as, for example, server 300 in FIG. 3. Logically partitioned platform 400 includes partitioned hardware 430, hypervisor 410, and operating systems 402–408. Operating systems 402–408 may be multiple copies of a single operating system or multiple heterogeneous operating systems simultaneously run on platform 400.

Partitioned hardware 430 includes a plurality of processors 432–438, a plurality of system memory units 440–446, a plurality of input/output (I/O) adapters 448–462, and a storage unit 470. Each of the processors 432–438, memory units 440–446, and I/O adapters 448–462 may be assigned to one of multiple partitions within logically partitioned platform 400, each of which corresponds to one of operating systems 402–408.

Hypervisor 410, implemented as firmware, performs a number of functions and services for operating system images 402–408 to create and enforce the partitioning of logically partitioned platform 400. Firmware is "hard software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM).

Hypervisor 410 provides a secure direct memory access (DMA) window, per I/O adapter, such as, for example, I/O adapter 328 in FIG. 3, on a shared I/O bus, such as, for example, I/O bus 312 in FIG. 3, into the memory resources allocated to its associated OS image, such as, for example, OS image 202 in FIG. 2. The secure DMA window provides access from an I/O adapter to memory which is allocated to the same partition as the I/O adapter, while preventing the I/O adapter from getting access to the memory allocated to a different partition.

In one embodiment, as implemented within an RS/6000 Platform Architecture, the hypervisor makes use of two existing hardware mechanisms. These hardware mechanisms are called the translation control entry (TCE) facility and the DMA range register facility Bridge. In one embodiment, the TCE facility is implemented in the PCI Host Bridge, such as PCI Host Bridges 314, 322, 330, and 340 in FIG. 3, and the range register facility is implemented in the Terminal Bridge, such as Terminal Bridges 316–317, 324–325, 332–333, and 342–343.

The TCE facility (not shown) is a facility for the I/O which is analogous to the virtual memory address translation facility provided by most processors today. That is, the TCE facility provides a mechanism to translate a contiguous address space on the I/O bus to a different and possibly non-contiguous address space in memory. It does this in a manner similar to the processor's translation mechanism, and thus breaks the address space of the memory and the address space of the I/O bus into small chunks, called pages. For IBM PowerPC processor based platforms, this size is generally 4 Kbytes per page. Associated with each page is a translation and control entry. This translation and control entry is called a TCE for this I/O translation mechanism, and is sometimes called the Page Table Entry for the corresponding processor virtual translation mechanism. These translation entries are in different tables for the processor and I/O.

When an I/O operation starts on the bus, the TCE facility accesses the entry for that page in the TCE table, and uses the data in that entry as the most significant bits of the address to access memory, with the least significant bits being taken from the I/O address on the bus. The number of bits used from the bus is dependent on the size of the page, and is the number of bits necessary to address to the byte level within the page (e.g., for the 4 Kbyte page size example, the number of bits taken from the bus would be 12, as that is the number of bits required to address to the byte level within the 4 Kbyte page). Thus, the TCE provides bits to determine which page in memory is addressed, and the address bits taken from the I/O bus determines the address within the page.

The bus address ranges that the IOAs are allowed to place onto the I/O bus are limited by the range register facility. The range register facility contains a number of registers that hold addresses that are compared to what the I/O adapter is trying to access. If the comparison shows that the I/O adapter is trying to access outside of the range of addresses that were programmed into the range registers by the firmware, then the bridge will not respond to the I/O adapter, effectively blocking the I/O adapter from accessing addresses that it is not permitted to access. In this embodiment, these two hardware mechanisms are placed under the control of the hypervisor.

When platform 400 is initialized, a disjoint range of I/O bus DMA addresses is assigned to each of I/O adapters 448–462 for the exclusive use of the respective one of I/O adapters 448–462 by hypervisor 410. Hypervisor 410 then configures the Terminal Bridge range register (not shown) facility to enforce this exclusive use. Hypervisor 410 then communicates this allocation to the owning one of OS images 402–408. Hypervisor also initializes all entries in a particular I/O adapters associated section of the TCE table to point to a reserved page per image that is owned by the OS image that is allocated to that I/O adapter, such that unauthorized accesses to memory by an I/O adapter will not create an error that could affect one of the other OS images 402–408.

When an owning one of OS images 402–408 requests to map some of its memory for a DMA operation, it makes a call to the hypervisor 410 including parameters indicating the I/O adapter, the memory address range, and the associated I/O bus DMA address range to be mapped. The hypervisor 410 checks that the I/O adapter and the memory address range are allocated to the owning one of OS images 402–408. The hypervisor 410 also checks that the I/O bus DMA range is within the range allocated to the I/O adapter. If these checks are passed, the hypervisor 410 performs the requested TCE mapping. If these checks are not passed, the hypervisor rejects the request.

Hypervisor 410 also may provide the OS images 402–408 running in multiple logical partitions each a virtual copy of a console and operator panel. The interface to the console is changed from an asynchronous teletype port device driver, as in the prior art, to a set of hypervisor firmware calls that emulate a port device driver. The hypervisor 410 encapsulates the data from the various OS images onto a message stream that is transferred to a terminal, such as hardware system console computer 480. In these examples, multiple hardware system consoles are supported. As illustrated, hardware system console 482 and hardware system console 484 also are present.

Hardware system consoles 480–484 are connected directly to logically partitioned platform 400, as illustrated in FIG. 4, or may be connected to logically partitioned platform through a network, such as, for example, network 102 in FIG. 1. These hardware system consoles may be, for example, a desktop computer, a laptop computer, or any other terminal and may be implemented as using data processing system 200 in FIG. 2. Hardware system console 480 decodes the message stream and displays the information from the various OS images 402–408 in separate windows, at least one per OS image. Similarly, keyboard input information from the operator is packaged by the hardware system console, sent to logically partitioned platform 400 where it is decoded and delivered to the appropriate OS image via the hypervisor 410 emulated port device driver associated with the then active window on the hardware system console 480. Hypervisor 410 may also perform other functions and services.

Those of ordinary skill in the art will appreciate that the hardware and software depicted in FIG. 4 may vary. For example, more or fewer processors and/or more or fewer operating system images may be used than those depicted in FIG. 4. The depicted example is not meant to imply architectural limitations with respect to the present invention.

The present invention provides a method, apparatus, and computer implemented instructions for managing access to a service processor by multiple terminals. In these examples, the terminals are HSCs, which may be implemented using data processing system 200 in FIG. 2. The mechanism of the present invention provides a locking mechanism for the service processor. When a terminal requires exclusive access to the service processor, the terminal queries the service processor and receives a good return code if the service processor is accessible. The service processor is then locked for the exclusive use of the terminal. Other terminals will be unable to access the service processor. If the service processor is not accessible, then a code indicating that the service processor is locked is returned to the terminal. In this case, the terminal is required to wait until the service processor becomes unlocked.

The mechanism of the present invention also provides an override capability to override a lock on the service processor. This override may be initiated through the use of a selected code in these examples. This override capability allows for releasing a lock on the service processor if another terminal has not released the service processor, but is no longer requiring access to the service processor. This situation may occur if a terminal has stopped running and has not released the lock on the service processor. Such an override may occur if no activity occurs for a selected period of time or in response to some other event. This override may be initiated by another terminal or the service processor itself.

Turning next to FIG. 5, a flowchart of a process used for managing access to a service processor is depicted in accordance with a preferred embodiment of the present invention. The process illustrated in FIG. 5 may be implemented in the form of computer instructions executed by service processor 366 in FIG. 3. In these examples, the process is implemented in a application layer following an Open System Interconnection (OSI) model for the service processor.

The process begins by receiving a request from a terminal, such as an HSC (step 500). A determination is made as to whether the request is for exclusive access (step 502). If the request is for exclusive access, a determination is made as to whether the service processor is locked to another HSC (step 504). If the service processor is not locked, the service processor is locked for exclusive use by the HSC (step 506). A response is returned to the HSC, indicating exclusive use has been granted to the HSC (step 508) with the process terminating thereafter.

With reference again to step 502, if the request is not for exclusive access, a determination is made as to whether the request is a write request (step 510). If the request is a write request, a determination is made as to whether the service processor is locked to this HSC (step 512). If the service processor is locked, access to the service processor is provided to the HSC (step 514) with the process terminating thereafter.

With reference again to step 504, if the service processor is locked, a determination is made as to whether the request includes an override (step 516). If the request includes an override, access is provided to the requesting HSC (step 518). A message is sent to the HSC assigned exclusive use of the service processor to indicate that the service processor is now unlocked and accessible by other HSCs (step 520) with the process terminating thereafter.

With reference again to step 516, if the request does not include an override, a response is returned that the service processor is locked (step 522) with the process terminating thereafter. With reference again to step 512, if the service processor is not locked, the process proceeds to step 522 as described above.

With reference again to step 510, if the request is not a write request, the process proceeds to step 514 as described above. In this case, the request is a read request and access is allowed even if the service processor is locked to another HSC. In other words, the process in FIG. 5 allows for a read access to occur even if the service processor is locked for use by another HSC.

The example illustrated by FIG. 5 provides for an override capacity, which is initiated by a terminal, such as an HSC. This override capacity also may be initiated by the service processor in response to an event, such as the expiration of a period of time.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for providing access to a service processor located within the data processing system, the method comprising:

a plurality of hardware management computer systems that are responsible for managing logical partitioning of said data processing system, said plurality of hardware management computer systems being external to said data processing system and coupled to said service processor;

responsive to receiving a request to provide a hardware management computer system within the plurality of hardware management computer systems sole access to access the service processor:

responsive to the service processor being unlocked, returning a first indication and locking the service processor to provide the hardware management computer system sole access to the service processor; and responsive to the service processor being locked, returning a second indication.

2. The method of claim 1, wherein the plurality of hardware management computer systems access the service processor using a hypervisor that is included in the data processing system, said hardware management computer systems managing the logical partitioning of the data processing system using said hypervisor.

3. The method of claim 1, wherein the data processing system includes a set of logical partitions.

4. The method of claim 3, wherein the service processor provides access to a set of objects used to manage the set of logical partitions.

5. The method of claim 1 further comprising:

unlocking the service processor in response to a second hardware management computer system sending a particular request to override locking of the service processor by the hardware management computer system.

6. A data processing system for providing a plurality of access to a service processor located within the data processing system, the data processing system comprising:

a plurality of hardware management computer systems that are responsible for managing logical partitioning of said data processing system, said plurality of hardware management computer systems being external to said data processing system and coupled to said service processor;

first returning means, responsive to receiving a request to provide a hardware management computer system within the plurality of hardware management computer systems sole access to access the service processor, for returning a first indication if the service processor is unlocked;

locking means, responsive to receiving a request to provide a hardware management computer system sole access to access the service processor, for locking the service processor to provide the hardware management computer system sole access to service processor; and second returning means, responsive to receiving a request to provide a hardware management computer system sole access to access the service processor, for returning a second indication if the service processor is locked.

7. The data processing system of claim 6, wherein the plurality of hardware management computer systems access the service processor using a hypervisor that is included in the data processing system, the hardware management computer systems managing logical partitioning of the data processing system using the hypervisor.

8. The data processing system of claim 6, wherein the data processing system includes a set of logical partitions.

9. The data processing system of claim 8, wherein the service processor provides access to a set of objects used to manage the set of logical partitions.

10. The data processing system of claim 6 further comprising:

unlocking means for unlocking the service processor in response to a second hardware management computer system sending a particular request to override locking of the service processor by the hardware management computer system.

11. A computer program product in a computer readable medium for providing access to a service processor located within the data processing system, the computer program product comprising:

a plurality of hardware management computer systems that are responsible for managing logical partitioning of said data processing system, said plurality of hardware management computer systems being external to said data processing system and coupled to said service processor;

instructions, responsive to receiving a request to provide a hardware management computer system within the plurality of hardware management computer systems sole access to access the service processor, for returning a first indication if the service processor is unlocked;

instructions, responsive to receiving a request to provide a hardware management computer system sole access to access the service processor, for locking the service processor to provide the hardware management computer system sole access to service processor; and instructions, responsive to receiving a request to provide a hardware management computer system sole access to access the service processor, for returning a second indication if the service processor is locked.

12. The computer program product of claim 11, wherein the plurality of hardware management computer systems access the service processor using a hypervisor that is included in the data processing system, the hardware management computer systems managing logical partitioning of the data processing system using the hypervisor.

13. The computer program product of claim 11, wherein the data processing system includes a set of logical partitions.

14. The computer program product of claim 13, wherein the service processor provides access to a set of objects used to manage the set of logical partitions.

15. The computer program product of claim 11 further comprising:

instructions for unlocking the service processor in response to a second hardware management computer system sending a particular request to override locking of the service processor by the hardware management computer system.

16. The method according to claim 1, further comprising:

determining that one of said plurality of hardware management computer systems requires exclusive use of said service processor;

querying said service processor by said one of said plurality of hardware management computer systems;

returning from said service processor to said one of said plurality of hardware management computer systems a code that indicates whether said service processor is already locked;

in response to said code indicating that said service processor is not already locked, locking said service processor for exclusive use by said one of said hardware management computer systems; and in response to said code indicating that said service processor is already locked, waiting by said hardware management computer system until said service processor is no longer locked to lock said service processor.

17. The method according to claim 16, further comprising:

in response to said code indicating that said service processor is already locked, determining whether said lock should be overridden;

in response to determining that said lock should be overridden, overriding said lock causing said service processor to become unlocked and locking said service processor for exclusive use by said one of said hardware management computer systems.

18. The method according to claim 17, wherein the step of determining whether said lock should be overridden further comprises determining whether one of said plurality of hardware management computer systems that caused said service processor to be locked is no longer requiring access to said service processor but has not released the lock.

* * * * *

UNITED STATES PATENT AND TRADEMARK OFFICE
CERTIFICATE OF CORRECTION

| | | |
|---|---|---|
| PATENT NO. | : 6,938,114 B2 | Page 1 of 1 |
| APPLICATION NO. | : 09/798165 | |
| DATED | : August 30, 2005 | |
| INVENTOR(S) | : Foster et al. | |

It is certified that error appears in the above-identified patent and that said Letters Patent is hereby corrected as shown below:

Col. 10, line 7: before "that" delete "bypervisor" and insert --hypervisor--.

Signed and Sealed this

Fifth Day of December, 2006

JON W. DUDAS
*Director of the United States Patent and Trademark Office*